US006908983B2

(12) United States Patent
Maslanka

(10) Patent No.: US 6,908,983 B2
(45) Date of Patent: Jun. 21, 2005

(54) SYNTHESIS OF HIGH SOLIDS RESINS FROM AMINE TERMINATED POLYAMIDES

(75) Inventor: William W. Maslanka, Landenberg, PA (US)

(73) Assignee: Hercules Corporation, Wilmington, DE (US)

( * ) Notice: Subject to any disclaimer, the term of this patent is extended or adjusted under 35 U.S.C. 154(b) by 48 days.

(21) Appl. No.: 10/404,940

(22) Filed: Apr. 1, 2003

(65) Prior Publication Data

US 2004/0198947 A1 Oct. 7, 2004

(51) Int. Cl.[7] .......................... C08G 69/48; C08L 77/00; C08L 79/00; D21H 3/48; D21H 11/00

(52) U.S. Cl. ....................... 528/310; 528/322; 528/332; 528/335; 528/340; 528/342; 528/343; 525/430; 525/435; 525/436; 524/600; 524/602; 524/606; 524/608; 524/842; 162/111; 162/157.2; 162/157.3; 162/164.1; 162/164.2; 162/164.3; 162/202

(58) Field of Search ................................ 528/310, 322, 528/332, 335, 340, 342, 343; 525/430, 435; 524/602, 606, 600, 608, 842; 162/111, 164.1, 164.2, 202, 164.3, 164.6, 157.2, 157.3

(56) References Cited

U.S. PATENT DOCUMENTS 2,926,116 A 2/1960 Keim
2,926,154 A 2/1960 Keim
3,332,901 A 7/1967 Keim
4,487,884 A * 12/1984 Maslanka .................. 524/845
4,515,657 A * 5/1985 Maslanka ................ 162/164.3
4,970,250 A * 11/1990 Martinez et al. ............ 524/145
5,278,255 A * 1/1994 Weaver et al. .............. 525/421
5,373,087 A * 12/1994 Weaver et al. .............. 528/335
5,644,021 A 7/1997 Maslanka
5,668,246 A 9/1997 Maslanka
5,786,429 A * 7/1998 Allen ......................... 525/430
5,902,862 A * 5/1999 Allen ......................... 525/430
6,171,440 B1 * 1/2001 Staib ............................ 162/4
6,222,006 B1 4/2001 Kokko et al.
6,245,874 B1 * 6/2001 Staib et al. .................... 528/3
6,352,613 B1 * 3/2002 Maslanka ................... 162/111
6,355,137 B1 * 3/2002 Staib ............................ 162/5
6,667,384 B2 * 12/2003 Gu et al. .................... 528/342

FOREIGN PATENT DOCUMENTS

| | | | |
|---|---|---|---|
| EP | 0 374 938 A1 | 6/1990 | ........... C08G/69/48 |
| EP | 0 802 215 A1 | 10/1997 | ........... C08G/73/02 |
| GB | 1401244 | 7/1975 | ........... C08G/69/48 |
| WO | 00/77076 A1 | 12/2000 | ........... C08G/73/02 |

OTHER PUBLICATIONS

The mechanism of wet–stength development in paper: a review; H.H. Espy, TAPPI J., 78, 90 (1995).

* cited by examiner

*Primary Examiner*—P. Hampton Hightower
(74) *Attorney, Agent, or Firm*—Gary A. Samuels; Robert O'Flynn O'Brien

(57) ABSTRACT

The present invention contemplates a process for forming polyaminoamide polymers formed by the reaction of a dibasic acid/ester with excess amounts of an amine; the intermediate polymer resulting therefrom; a process for synthesizing effective, high solids resins resulting from the reaction of intermediate polymers with an epihalohydrin; and the resultant high, solids resin. These resins may be used as wet strength resins in the papermaking industry.

31 Claims, No Drawings

SYNTHESIS OF HIGH SOLIDS RESINS FROM AMINE TERMINATED POLYAMIDES

TECHNICAL FIELD AND INDUSTRIAL APPLICABILITY OF INVENTION

The present invention relates to a process for forming polyaminoamide polymers using excess amounts of an amine; the intermediate polymer resulting therefrom; a process for synthesizing effective, high solids wet strength resins; and the polyaminoamide resin resulting therefrom.

BACKGROUND OF THE INVENTION

Polyaminoamide based resins have been used for over forty years in the manufacture of paper under neutral and alkaline conditions. Furthermore, in the paper industry, polyaminoamides made from dibasic acids and polyamines are commonly used as pre-polymers for the synthesis of polyaminoamide-epichlorohydrin (PAE) resins (e.g. H. H. Espy, *TAPPI J.,* 78, 90 (1995)). Typically, to result in a resin, a polyaminoamide is treated with epichlorohydrin, which reacts with the secondary amines in the polymer backbone to form chlorohydrin, azetidinium or epoxide functionalities necessary for self-crosslinking and reacting with the cellulosic pulp fiber as shown in U.S. Pat. Nos. 2,926,116; 2,926,154; 3,332,901; 5,644,021; 6,222,006; and 5,668,246.

The procedures for making polyaminoamide-epihalohydrin resins are well known in the art. However, with respect to making the polyaminoamides, typical processes produce polyaminoamides having a high molecular weight and a wide molecular weight distribution and are generally prepared using a 1:1 mole ratio of dibasic acid and polyamine. The high molecular weight of the polyaminoamide, when later converted to a resin, limits the level of solids at which the resin can be prepared and stored while still maintaining a high level of performance. As a result, the concentration of resin solids are in the range of about 10 wt.-% to about 30 wt.-% of the resin, but are generally limited to a maximum of about 30 wt.-%. At present, there is a need within the industry to provide high solids resins having the capacity to undergo long periods of storage while maintaining a level of performance substantially equal to those resins having a lowers solids content.

Recently, the approach to synthesizing high solids resins has involved reducing the molecular weight of the polyaminoamide via an endcapping technique using a monobasic acid to control the growth of the polymer chains and the molecular weight distribution. Conversion of such polyaminoamides to resins through reaction with epihalohydrins has produced resin solids as high as 40%. However these types of processes necessitate the handling of extra ingredients not required by the present invention. Thus, the present invention provides for a simpler, more efficient process than those currently used in the art.

There are several distinct advantages conferred by the present invention. First, the present invention allows one to control the molecular weight of the polyaminoamide via the increased polyamine:dibasic acid/ester mole ratio producing a low molecular weight polymer with a narrow molecular weight distribution. Second, the additional amine groups resulting from the increased polyamine:dibasic acid/ester mole ratio provide additional sites for reaction with epihalohydrin, thus giving potentially higher reactive functionality. Third, the combination of low molecular weight and a narrow molecular weight distribution allows for the synthesis of high solids resins having good storage stability and performance.

SUMMARY OF THE INVENTION

The present invention relates to a wet strength agent and creping aid useful in papermaking.

The present invention contemplates a process for the synthesis of a polyaminoamide intermediate polymer, as well as the intermediate polymer itself, comprising the steps of:

(a) mixing an amount of a dibasic acid or ester and an excess amount of an amine, thereby forming a polymerization mixture; and (b) allowing the polymerization mixture from step (a) to polymerize to completion.

The present invention further contemplates a process for the synthesis of a high solids polyaminoamide resin, as well as the high solids resin itself, comprising the step of:

(c) reacting the mixture from step (b) with an epihalohydrin; and (d) allowing the reaction to proceed wherein the intermediate polymer is cross-linked.

The present invention also relates to cellulosic products produced using a high solids resin of the present invention.

DETAILED DESCRIPTION OF A PREFERRED EMBODIMENT OF THE INVENTION

The present invention contemplates a process for the synthesis of a polyaminoamide intermediate polymer, as well as the intermediate polymer itself, comprising the steps of:

(a) mixing an amount of a dibasic acid or ester and an excess amount of an amine, wherein the dibasic acid/ester:amine mole ratio ranges from about 1:1.125 to about 1:1.175, thereby forming a polymerization mixture; and (b) allowing the polymerization mixture from step (a) to polymerize to completion.

The present invention further contemplates a process for the synthesis of a high solids polyaminoamide resin, as well as the high solids resin itself, comprising the step of:

(c) reacting the mixture from step (b) with an epihalohydrin; and (d) allowing the reaction to proceed where the intermediate polymer is cross-linked.

The polyaminoamide synthesis is generally carried out neat although some water may be added to facilitate mixing of the monomers (10–20% based on monomers) and removed with the water of polycondensation.

The amount of the dibasic acid or ester and the excess amount of the amine utilized to form the polymerization mixture of the present invention are defined by the comonomer ratio. The comonomer, in turn, is determinative of the intermediate polymer's molecular weight. The molecular weight of the intermediate polymer varies according to the reaction temperature, the specific monomers used for the reaction, their ratio and the reaction time. The molecular weight and distribution are determined by Size Exclusion Chromatography, a technique that discriminates materials based primarily on the size of the molecules. Controlling the dibasic acid/ester:amine mole ratio, particularly through the use of excess amounts of the amine allows for the control of the molecular weight, as well as the narrow molecular weight distribution. Typically the excess amount of the amine ranges from about 10 to about 20%, when compared to the amount of dibasic acid/ester utilized, preferably between about 12.5% and about 17.5%. Thus in terms of defining the relationship between molecular weight and comonomer ratio, a dibasic acid/ester:amine mole ratio of about 1:1 generally corresponds to a number average molecular weight ($M_n$) ranging from about 3000 to about 3500 Daltons. However, in the present invention the dibasic acid/ester:amine mole ratio preferably ranges from about 1:1.175 to about 1:1.125, which generally corresponds to a low number average molecular weight and narrow weight distribution of about 1600 to about 2100 Daltons and a polydispersity ($M_w/M_n$) ranging from about 1.5 to about 2. The amine number on a dry basis for the polyaminoamide ranges from 6.1–6.7 meq/g. In addition the polymer mixture has a solids content of the intermediate polymer generally ranging from about 30 wt.-% to about 70 wt.-%, preferably about 48–50 wt.-%.

In the process of the present invention, step (a) is an exothermic reaction owing to salt formation when the polyamine and dibasic acid are mixed and therefore, the reaction vessel should be cooled through any suitable means known in the art to prevent any loss of monomers. Preferably, this reaction temperature of step a) should be controlled so it remains below about 110° C. The rate of addition may be performed at any rate so long as the reaction temperature stays below the cited temperature. After the addition is completed, the polycondensation itself is carried out at about 169–171° C. In general, there is no particular sequence required for mixing the components of step a), however, the polyamine is preferably charged first followed by the dibasic acid or ester.

The reaction time is partially determinative of the molecular weight of the intermediate polymer, wherein a longer reaction time generally corresponds to a higher molecular weight. The reaction time can be adjusted to provide an intermediate polymer having the appropriate molecular weight for the desired application. Typically, at the beginning of the reaction the polymerization mixture may be pasty, but as the polymerization reaction proceeds, the contents of the reaction vessel become clear and the viscosity increases. A sample can be withdrawn from the polymerization mixture, and the viscosity determined. In general, the formation of the appropriate intermediate polymer results in a clear solution after water addition having a Brookfield viscosity of about 135–195 cps, and preferably 150–180 cps.

The resultant intermediate polymer has the combination of a reduced molecular weight and a narrow weight range distribution, which when later reacted with an epihalohydrin provides a high solids resin with good storage stability and good wet-strength and creping performance. The intermediate polymer of the present invention also contains additional amine groups, thereby providing additional sites for reaction with an epihalohydrin. For example, as shown in Examples 1, 2 and 3 with respect to DETA, as the amount of excess DETA utilized in the present invention increases, the amine number also increases. The increased number of amine groups may be shown using amine analysis, a well known technique within the art.

According to the present invention, the intermediate polymer resulting from step (b) may be either a linear or a branched condensation polymer. In a general and representative sense, the intermediate polymer, also contemplated by the present invention, has the general formula:

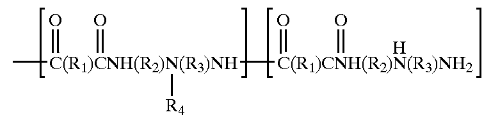

wherein $R_1$ ranges from $C_2$–$C_8$; $R_2$ ranges from $C_2$–$C_6$; $R_3$ ranges from $C_2$–$C_5$, and $R_4$ is $$-\overset{O}{\overset{\|}{C}}(R_1)\overset{O}{\overset{\|}{C}}NH(R_2)\overset{H}{N}(R_3)NH_2$$

For example, the linear polymer structure from the reaction product of adipic acid and DETA would be:

Linear $$\left[\overset{O}{\overset{\|}{C}}(CH_2)_a\overset{O}{\overset{\|}{C}}NH(CH_2)_b\overset{H}{N}(CH_2)_cNH\right]\left[\overset{O}{\overset{\|}{C}}(CH_2)_a\overset{O}{\overset{\|}{C}}NH(CH_2)_b\overset{H}{N}(CH_2)_cNH_2\right]$$

wherein a ranges from 2–8, b ranges from 2–6 and c ranges from 2–6. Preferably, a ranges from 2–6, b ranges from 2–4 and c ranges from 2–4; more preferably a is 3–4, b is 2–3 and c is 2–3.

One of the possible branch structures from the same reaction is given as follows:

Branched

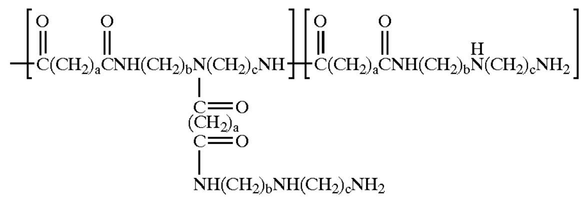

wherein a ranges from 2–8, b ranges from 2–6 and c ranges from 2–6. Preferably, a ranges from 2–6, b ranges from 2–4 and c ranges from 2–4; more preferably a is 3–4, b is 2–3 and c is 2–3.

Generally, the structure resulting from processes known in the art utilizing the endcapping method is as follows:

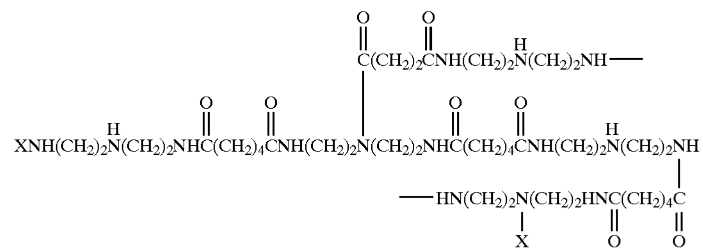

wherein

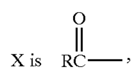

and R is methyl, ethyl and the like.

Examples of suitable dibasic acids include, but are not limited to, adipic acid, glutaric acid, succinic acid, azelaic acid, sebacic acid, maleic acid, fumaric acid, itaconic acid, oxalic acid and mixtures thereof. Dibasic acids having 4–8 carbons are preferred.

Examples of suitable dibasic esters include, but are not limited to, dimethyladipate, dimethylsebacate, dimethylitaconate, dimethylazelate, dimethyloxalate, dimethylglutarate and mixtures thereof. The dibasic esters suitable for the present invention may be prepared by any known alcohol known in the art, for example, ethanol, propanol, butanol, pentanol, hexanol, isopropanol, benzyl alcohol, phenol and the like and mixtures thereof.

The polyamine functions to control the growth of polyamide chains reducing the molecular weight and narrowing the distribution. Examples of suitable diamines contemplated by the present invention include, but are not limited to, diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis (aminopropyl)amine (MBAPA), bis(hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof. The preferred diamines are diethylene triamine (DETA), triethylene tetraamine (TETA), tetraethylene pentaamine (TEPA) and combinations thereof. The most preferred diamine is diethylene triamine (DETA).

The present invention further contemplates reacting the intermediate polymer with an epihalohydrin, preferably epichlorohydrin, thereby resulting in a high solids polyamide resin, wherein the polymer has the ability to cross-link with itself or to react with other materials, such as paper, pulp, wool, wood and the like. When the polymers of the present invention are treated with epichlorohydrin under the appropriate reaction conditions (i.e., those conditions shown in the Examples are preferred), the resulting resins are water-soluble, cationic resins. The resin synthesis is most commonly carried out in water (40–44 wt.-% solids before dilution to the final solids content percentage). The epichlorohydrin:polyaminoamide ratio is based on the amine number in the polymer (e.g. the epi:amine equivalents). The epichlorohydrin:amine equivalent ratio ranges from 1:1 to 1:1.3, preferably 1:1.2 to 1:1.25. The high solids resins according to the present invention generally have a solids content, of the intermediate polymer and epihalohydrin, in the range of about 30–50 wt.-%, preferably in the range of about 30–45 wt.-% and more preferably about 39–41 wt.-%.

The reaction time varies depending upon the reaction temperature, where lower temperatures generally require longer reaction times. The reaction is preferably carried out until all or substantially all of the available amine groups are reacted with the epihalohydrin. Manipulation of temperatures aid in determining the functionality of the resin, for example, in reacting the intermediate polymer with an epihalohydrin, it may occur at a temperature up to about 70° C., wherein the temperature may remain constant throughout the reaction or it may be multi-staged such that a low temperature is used initially and subsequently utilizes an elevated temperature. At a predetermined terminal viscosity water may be added to adjust the resin's solids content and the pH adjusted to about 2.7–3.3, preferably about 2.8–3.0, preferably using a combination of sulfuric and formic acids. These types of resins may be used as wet strength resins and/or creping aids in papermaking processes.

According to the present invention, the high solids resin may have either a linear or branched structure. In a general and representative sense, the high solids resin, also contemplated by the present invention, has the general linear formula:

Linear

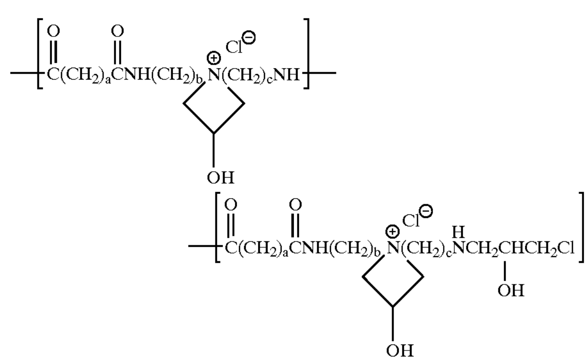

wherein a ranges from 2–8, b ranges from 2–6 and c ranges from 2–6. Preferably, a ranges from 2–6, b ranges from 2–4 and c ranges from 2–4; more preferably a is 3–4, b is 2–3 and c is 2–3.

A general branched structure is given as follows:

Branched

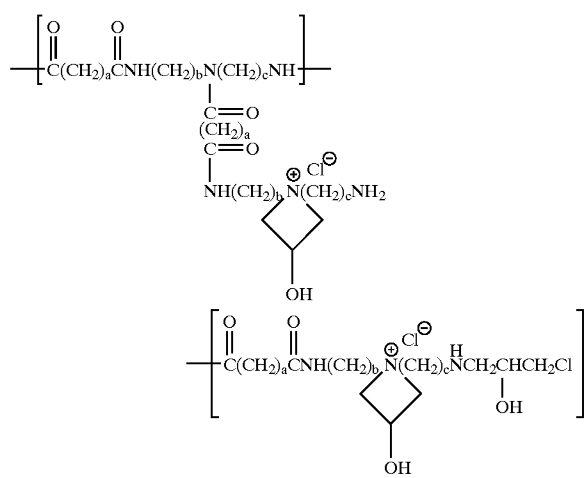

wherein a ranges from 2–8, b ranges from 2–6 and c ranges from 2–6. Preferably, a ranges from 2–6, b ranges from 2–4 and c ranges from 2–4; more preferably a is 3–4, b is 2–3 and c is 2–3.

The present invention provides resins having superior storage stability when compared to those resins utilizing high molecular weight polyaminoamides. Typically, a resin contemplated by the present invention having a solids content of about 40% and stored at about 25° C. (77° F.) to about 32° C. (90° F.) will remain stable to gelation (visual observation) for about 3 to about 6 weeks.

The present invention further contemplates cellulosic products produced using a high solids resin of the present invention in any conventional process typically utilized to produce cellulosic products such as paper towels, napkins, writing paper, and the like. The resin may be incorporated into cellulosic products in an amount generally ranging from about 0.25% to about 3%, wherein for paper the amount ranges from about 0.25% to about 1.5%; wherein for napkins the amount ranges from about 0.25% to about 1.0%; and wherein for paper towels the amount ranges from about 0.5% to about 1.5%; based on the dry weight of the paper. The quantity of resin added to aqueous paper stock is dependent upon the degree of wet strength desired and the amount of resin retained by the paper fibers. The paper, either preformed or partially dried, can be impregnated by immersion in the resin or by spraying the resin onto the paper. Subsequently, the paper can be heated for about 5 to about 30 minutes at temperatures of about at least 80° C. in order to fully cure the resin.

The embodiments of the present invention are further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various uses and conditions. Thus various modifications of the present invention in addition to those shown and described herein will be apparent to those skilled in the art from the foregoing description. Although the invention has been described with reference to particular means, materials and embodiments, it is to be understood that the invention is not limited to the particulars disclosed, and extends to all equivalents within the scope of the claims.

EXAMPLES

The polyaminoamides for Examples 1, 2 and 3 were made as set forth below, where the varying factor was the excess amount of DETA utilized in the reaction. The storage stability was tested by storing the resins at 90° C. for a period of 6 weeks. Stability is determined by assessing whether gelation has occurred in the mixture (visual observation or comparison to Gardner-Holdt standards at 25° C.).

Comparative Example—C

Comparative Example (C) shows the data for a lower solids, high molecular weight polyaminoamide, where the dibasic acid/ester:amine ratio was 1:1. This Comparative Example was prepared in the same manner as Examples 1, 2 and 3 except for the utilization of the 1:1 dibasic acid/ester:amine ratio.

Examples 1, 2 and 3

Copolymerization of Adipic Acid and Diethylenetriamine (12.5%. 15% and 17.5% Excess DETA)

Diethylenetriamine (174.2 g, 1.69 moles) was charged to the reaction vessel. Adipic acid (219.2 g, 1.5 moles) was cautiously added keeping the temperature below 110° C. After the addition was complete, the contents of the reaction vessel were heated to 169–170° C. and the water from the poly condensation removed by distillation. Total hold time at this temperature was 180 minutes. Dilution water was added and the polyaminoamide was stirred until dissolved, in order to attain the desired solids content.

Total solids=48.5%
Brookfield viscosity=211 cps
pH=10.7
Reduced viscosity=0.102 dL/g (1MNH$_4$Cl, 2%, 25° C.)
Mn=2273 Daltons
Mw=4223
Mz=6899
Mw/Mn=1.96
Amine No. =2.98 meq/g
Acid No. =0.106 meq/g

TABLE 1

Polyaminoamides made from adipic acid and excess diethylenetriamine

| Ex. | Mole Ratio* | Total Solids (%) | Brookfield Viscosity | pH | RV (dL/g) | Amine No. (meq/g) | Acid No. (meq/g) | Mn | Mw | Mw/Mn |
|---|---|---|---|---|---|---|---|---|---|---|
| C | 1:1 | 49.3 | 457 cps | 10.2 | 0.138 | 2.6 | 0.14 | 3200 | 7260 | 2.27 |
| 1 | 1:1.125 | 48.0 | 177 cps | 10.5 | 0.100 | 3.00 | 0.133 | 1915 | 3499 | 1.83 |
| 2 | 1:1.15 | 48.2 | 168 cps | 10.5 | 0.096 | 3.24 | 0.15 | 2026 | 3621 | 1.79 |
| 3 | 1:1.175 | 48.2 | 169 cps | 10.8 | 0.092 | 3.22 | 0.11 | 1642 | 2862 | 1.74 |

*The mole ratio is the ratio of the dibasic acid/ester:amine

The amine numbers and acid numbers in Table 1 are shown "as received". The true amine number for Examples 1, 2 and 3 and Comparative Example C are determined by dividing the value shown in Table 1 by the total solids value as shown in Table 2.

TABLE 2

Adjusted Amine and Acid Number Values

| Example | Amine No. | Acid No. |
|---|---|---|
| C | 5.27 | 0.28 |
| 1 | 6.25 | 0.28 |
| 2 | 6.72 | 0.31 |
| 3 | 6.68 | 0.23 |

Example 4

Synthesis of a Resin Using a Polyaminoamide Prepared with Excess Diethylenetriamine (12.5%)

Poly (adipic acid-co-diethylenetriamine) (12.5 mole % excess DETA) (80 g, 166.7 g, 48% solution, 0.50 equivalent amine) was charged to the reaction vessel and diluted to a total weight of 255.4 g. Epichlorohydrin (57.8 g, 0.625 equivalent) was added all at once. The temperature was raised to 68–70° C. and the viscosity was monitored. At Gardner-Holdt "U/V" 31 cc of cold water was added and concentrated $H_2SO_4$ was added to bring the pH to 4.8.25%

HCOOH was then added to lower the pH to 3.7 and the pH trimmed to 3.25 with additional concentrated $H_2SO_4$.
Total solids=39.4%
Brookfield viscosity=368 cps
GC Epichlorohydrin=0.029%

1,3 Dichloropropanol=2.48%

2,3 Dichloropropanol=81 ppm

3 Chloropropanediol=0.27%

90° F. stability=>6 weeks

Example 5

Synthesis of a Resin Using a Polyaminoamide Prepared with Excess Diethylenetriamine (15%)

Poly (adipic acid-co-diethylenetriamine) (15 mole % excess DETA) (24.4 g, 154.3 g, 48.2% solution, 0.5 equivalent amine) was charged to the reaction vessel and diluted to a total weight of 242.7 g. Epichlorohydrin (57.8 g, 0.625 equivalent) was added all at once. The temperature was raised to 6870° C. and the viscosity monitored. At Gardner-Holdt "U/V" 31 cc of cold water was added, followed by concentrated $H_2SO_4$ to bring the pH to 4.8.25% HCOOH was then added to lower the pH to 3.7 and the pH finally trimmed to 3.25 with additional concentrated $H_2SO_4$.
Total solids=39.5%
Brookfield viscosity=297 cps
GC Epichlorohydrin=0.006%

1,3 Dichloropropanol=2.64%

2,3 Dichloropropanol=157 ppm

3 Chloropropanediol=0.44%

90° F. stability=>6 weeks

Example 6

Synthesis of a Resin Using a Polyaminoamide Prepared with Excess Diethylenetriamine (17.5%)

Poly (adipic acid-co-diethylenetriamine) (17.5 mole % excess DETA) (75.3 g, 156.3 g, 48.2% solution, 0.5 equivalent amine) was charged to the reaction vessel and diluted to a total weight of 244.7 g. Epichlorohydrin (57.8 g, 0.625 equivalent) was added all at once. The temperature was raised to 68–70° C. and the viscosity monitored. At Gardner-Holdt "U/V" 30 cc of cold water was added, followed by concentrated $H_2SO_4$ to bring the pH to 4.8.25% HCOOH was then added to lower the pH to 3.77 and finally the pH was trimmed to 3.2 with additional concentrated $H_2SO_4$.
Total solids=40.1%
Brookfield viscosity=331 cps
GC Epichlorohydrin=0.008%

1,3 Dichloropropanol=2.44%

2,3 Dichloropropanol=0.009%

3 Chloropropanediol=0.028%

90° F. stability=>6 weeks

Example 7

Handsheet Evaluation of Resins

The resins of Examples 4, 5, 6, as well as Kymene® 557H wet strength resin, were evaluated in handsheets prepared from 50/50 blends of hardwood/softwood pulp beaten to a consistency of 2–2.5% in a cycle beater to 450 cc Canadian Standard Freeness at pH 7.5. Table 2 summarizes the results from the handsheet evaluation.

The percent resin incorporated into the handsheets was 0.5% (w/w) based on pulp fiber. Kymene® 557H (a polyamidoamine-epichlorohydrin wet stength agent supplied by Hercules, Incorporated of Wilmington, Del.) was used as the control. The percent resin is determined by adding resin (solid) based on dry pulp, (e.g. at 0.5% add-on to 50 grams of dry pulp in a slurry, 0.25 grams of resin would be added on a dry basis). The resin was then formed into handsheets having a basis weight of 40 lbs/ream (24"×36", 500 sheets) The sheets were dried to a moisture content of about 6%.

The handsheets were cured for 30 minutes at 80° C. The handsheets were tested for both dry strength and wet strength (after soaking in 20° C. distilled water for 2 hours).

The dry tensile strength and wet tensile strength were determined by the exertion of tension on the 1" wide paper strip being tested at a rate of 2–3" per minute and the maximum tensile strength was observed upon failure (TAPPI METHOD 494). The "% level" indicates the amount of resin utilized, based on the weight of the pulp.

TABLE 3

Handsheet Evaluation Results

| | | | Tensile (lbs./inch) | |
|---|---|---|---|---|
| Resin | % Level | Basis Weight | Cured Dry 80° C./30 min. | Cured Wet 80° C./30 min. |
| Example 4 | 0.25 | 40 | 20.7 | 3.92 |
| | 0.50 | 40 | 23.0 | 4.67 |
| | 1.0 | 40 | 21.6 | 5.32 |
| Example 5 | 0.25 | 40 | 21.1 | 3.48 |
| | 0.50 | 40 | 22.3 | 4.30 |
| | 1.0 | 40 | 21.6 | 4.92 |
| Example 6 | 0.25 | 40 | 21.3 | 3.55 |
| | 0.50 | 40 | 22.9 | 4.33 |
| | 1.0 | 40 | 22.1 | 4.71 |
| Kymene 557H | 0.25 | 40 | 22.2 | 3.69 |
| | 0.50 | 40 | 23.1 | 4.53 |
| | 1.0 | 40 | 22.4 | 5.33 |

What is claimed is:

1. A process for the synthesis of an intermediate polyamide polymer comprising:

(a) mixing an amount of a dibasic acid or ester and an excess amount of an amine, wherein the diacid/ester:amine mole ratio ranges from about 1:1.125 to about 1:1.175, thereby forming a polymerization mixture; and (b) allowing the polymerization mixture from step (a) to polymerize to completion.

2. The process according to claim 1, wherein the dibasic ester comprises at least one of dimethyladipate, dimethylsebacate, dimethylitaconate, dimethylazelate, dimethyloxalate, dimethylglutarate and mixtures thereof.

3. The process according to claim 1, wherein the dibasic acid comprises at least one of adipic acid, glutaric acid, oxalic acid, succinic acid, azelaic acid, sebacic acid, maleic acid, fumaric acid, itaconic acid and mixtures thereof.

4. The process according to claim 1, wherein the amine comprises at least one, of diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis (aminopropyl)amine (MBAPA), bis(hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof.

5. The process according to claim 4, wherein the amine comprises at least one of diethylene triamine (DETA), triethylene tetraamine (TETA), tetraethylene pentaamine (TEPA) and combinations thereof.

6. The process according to claim 5, wherein the amine is diethylene triamine (DETA).

7. The process according to claim 1, wherein the intermediate polymer has a molecular weight ranging from about 1600 to about 2100 Daltons.

8. The process according to claim 1, wherein the intermediate polymer is a water-soluble linear condensation polymer.

9. The process according to claim 1, wherein the intermediate polymer is a water-soluble branched condensation polymer.

10. An intermediate polymer reaction product produced according to the process of claim 1.

11. An intermediate polymer having a linear formula comprising:

$$-\!\!\left[\overset{O}{\overset{\|}{C}}(CH_2)_a\overset{O}{\overset{\|}{C}}NH(CH_2)_b\overset{H}{N}(CH_2)_cNH\right]\!\!-\!\!\left[\overset{O}{\overset{\|}{C}}(CH_2)_a\overset{O}{\overset{\|}{C}}NH(CH_2)_b\overset{H}{N}(CH_2)_cNH_2\right]$$

wherein a ranges from 2–8, b ranges from 2–6 and c ranges from 2–6.

12. An intermediate polymer having a branched formula comprising:

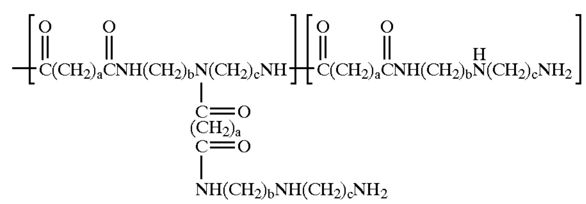

wherein a ranges from 2–8, b ranges from 2–6 and c ranges from 2–6.

13. A process for making a high solids polyamide resin comprising:

(a) mixing an amount of a dibasic acid or ester and an excess amount of an amine, wherein the dibasic acid/ester:amine mole ratio ranges from about 1:1.125 to about 1:1.175, thereby forming a polymerization mixture;

(b) allowing the polymerization mixture from step (a) to polymerize to completion;

(c) reacting the polymerization mixture with an epihalohydrin; and (d) allowing the reaction to proceed wherein the intermediate polymer reaction mixture is cross-linked.

14. The process according to claim 13, wherein the diester comprises at least one of dimethyladipate, dimethylsebacate, dimethylitaconate, dimethylazelate, dimethyloxalate, dimethylglutarate and mixtures thereof.

15. The process according to claim 13, wherein the dibasic acid comprises at least one of adipic acid, glutaric acid, oxalic acid, succinic acid, azelaic acid, sebacic acid, maleic acid, fumaric acid, itaconic acid and mixtures thereof.

16. The process according to claim 13, wherein the amine comprises at least one of diethylene triamine (DETA) or its analogs, N-(3-aminopropyl)-1,3-propanediamine (dipropylene triamine or DPTA), ethylene diamine (EDA), 1,6-hexamethylenediamine (HMDA), triethylene tetraamine (TETA), tetraethylene pentaamine (TEPA), N-methyl-bis (aminopropyl)amine (MBAPA), bis(hexamethylene triamine) (BHMT), tripropylene tetraamine, tetrapropylene pentaamine, spermine, spermidine, 1-phenyl-2,4-pentane diamine, 2-phenyl-1,3-propanediamine, 2-methyl-1,5-pentane diamine, and phenylene diamine and combinations thereof.

17. The process according to claim 16, wherein the amine comprises at least one of diethylene triamine (DETA), triethylene tetraamine (TETA), tetraethylene pentaamine (TEPA) and combinations thereof.

18. The process according to claim 17, wherein the amine is diethylene triamine (DETA).

19. The process according to claim 13, wherein the epihalohydrin is epichlorohydrin.

20. The process according to claim 13, wherein the high solids resin has a solids content in the range of about 30–50 wt.-%.

21. The process according to claim 20, wherein the high solids resin has a solids content in the range of about 30–45 wt.-%.

22. The process according to claim 21, wherein the high solids resin has a solids content in the range of about 3941 wt.-%.

23. The process according to claim 13, wherein the intermediate polymer of step b) is cross-linked with itself.

24. The process according to claim 13, wherein the intermediate polymer of step b) is cross-linked with another material.

25. A high solids polyamide resin produced according to the process of claim 13.

26. A high solids polyamide resin having a linear formula comprising:

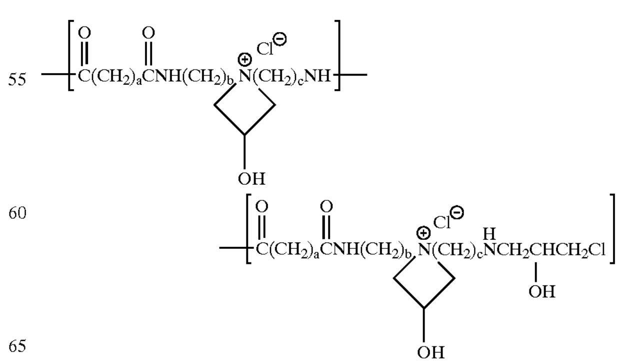

wherein a ranges from 2–8, b ranges from 2–6 and c ranges from 2–6.

27. A high solids polyamide resin having a branched formula comprising:

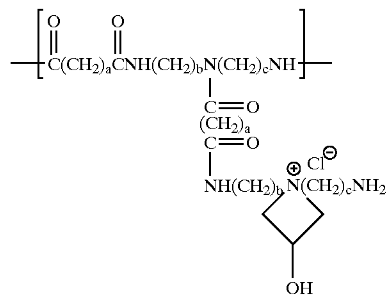

-continued

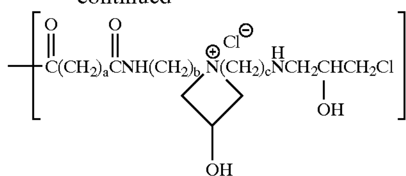

wherein a ranges from 2–8, b ranges from 2–6 and c ranges from 2–6.

28. A wet strength agent produced by the process of claim 13.

29. A creping aid produced by the process of claim 13.

30. A cellulosic product comprising the resin of claim 26.

31. A cellulosic product comprising the resin of claim 27.

* * * * *